United States Patent

[11] 3,617,253

| [72] | Inventor | Bernard Paul Louis Amiet<br>Bordeaux, France |
|---|---|---|
| [21] | Appl. No. | 783,505 |
| [22] | Filed | Dec. 13, 1968 |
| [45] | Patented | Nov. 2, 1971 |
| [73] | Assignee | Societe Des Accumulateurs Fixes et de Fraction (Societe Anonyme)<br>Seine-Saint-Denis, France |
| [32] | Priority | Dec. 18, 1967 |
| [33] | | France |
| [31] | | 132,741 |

[54] PRODUCTION OF METAL POWDERS, PARTICULARLY FOR USE IN ELECTRODES AND PRODUCTION OF ELECTRODES FROM THESE PRODUCTS
10 Claims, 3 Drawing Figs.

[52] U.S. Cl. .................................................. 75/0.5 A,
75/108, 75/118, 75/211
[51] Int. Cl. ....................................................... B22f 9/00,
B22f 3/12, B22f 5/00
[50] Field of Search ............................................. 75/0.5 A,
0.5 AA, 0.5 AB, 118, 108, 211

[56] References Cited
UNITED STATES PATENTS

| 2,752,237 | 6/1956 | Short ........................... | 75/118 |
|---|---|---|---|
| 2,753,257 | 7/1956 | Nashner et al. ................ | 75/118 |
| 2,767,082 | 10/1956 | Roy et al. ...................... | 75/108 |
| 2,767,083 | 10/1956 | Mackiw et al. ................ | 75/108 |
| 2,836,485 | 5/1958 | Schaufelberger et al. ..... | 75/108 |
| 2,853,374 | 9/1958 | Schaufelberger ............. | 75/108 |
| 3,234,007 | 2/1966 | Blocher, Jr. et al. .......... | 75/0.5 AB |
| 3,369,886 | 2/1968 | Metzger et al. ............... | 75/108 |
| 3,443,933 | 5/1969 | Boyhan et al. ................ | 75/108 |
| 3,494,760 | 2/1970 | Ginder ......................... | 75/108 |

Primary Examiner—L. Dewayne Rutledge
Assistant Examiner—W. W. Stallard
Attorney—Kenyon & Kenyon Reilly Carr & Chapin ABSTRACT: Process for manufacturing a metal powder having a predetermined structure consisting in chemically reducing to metallic state a solution of a salt of the metal intended to constitute the electrode by the addition thereto of an appropriate reducing agent, while the "solution-reducing agent" mixture is submitted to a perturbed whirling agitation, so that the concentration of salt and reducing agent are made uniform and so that a great number of metal germs are produced, the agitation being maintained in order to promote an agglomeration in successive concentric layers of particles until the predetermined size of conglomerates is obtained, then separating the conglomerates from the mother-liquid when the required size is reached and finally washing and drying the powder so prepared. The powder so prepared is then formed into electrodes of desired dimensions by compression and, if necessary, followed by subsequent sintering at moderate sintering temperature.

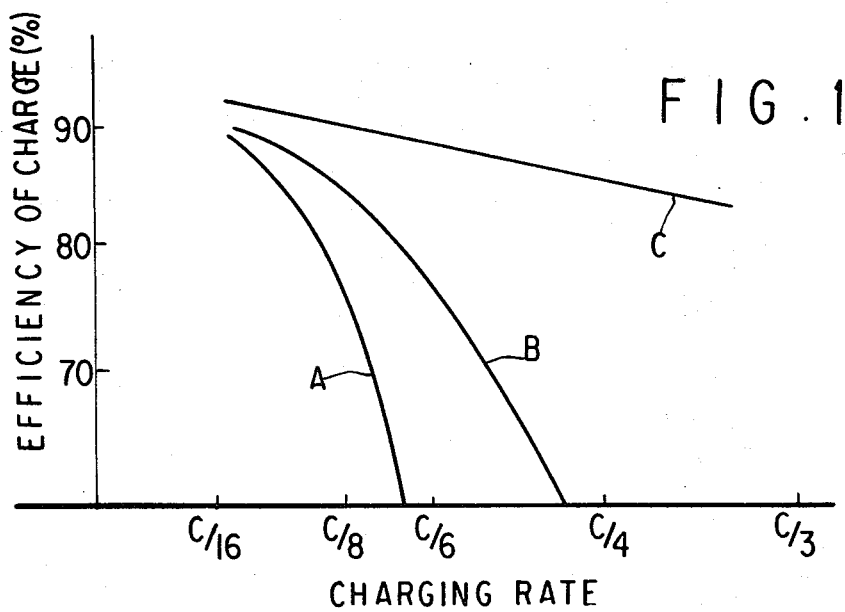
FIG. 1
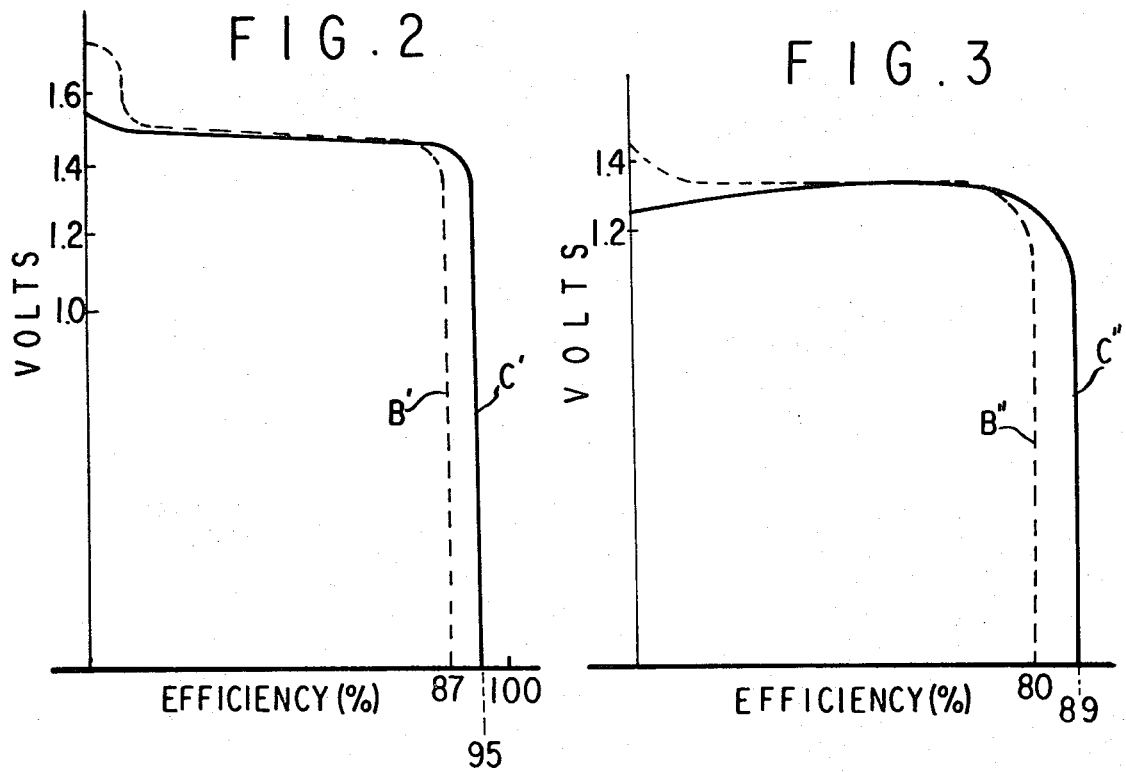
FIG. 2
FIG. 3
INVENTOR
BERNARD PAUL LOUIS AMIET
BY
ATTORNEYS

PRODUCTION OF METAL POWDERS, PARTICULARLY FOR USE IN ELECTRODES AND PRODUCTION OF ELECTRODES FROM THESE PRODUCTS

RELATED APPLICATIONS

There are no related applications copending.

BRIEF SUMMARY OF INVENTION

This invention relates to improved process of manufacturing metal powders, more particularly used for electrode production, powders derived from this process and electrodes made from these powders.

Electrodes comprising a double-pore distribution, that is to say, having at the same time small and large sized pores are already known. These known electrodes are obtained by sintering clusters of metal particles with very small-sized pores, the larger pores being situated between the agglomerated clusters.

Such known electrodes are advantageously used in storage cell designs because a faster flow of electrolyte is driven through the large-sized pores and a more regular distribution is insured through the smaller-sized pores in the porous electrode material so that electrolyte comes in contact with the major part of active material. Therefore, electrochemical efficiency of active material is substantially improved.

Such known electrodes are also advantageously used in fuel cell designs since the transfer of the reacting products is more efficient.

The French Pat. Nos. 1,055,278 and 1,143,502 filed respectively Apr. 29, 1952 and July 8, 1953 by BASF have described processes for manufacturing sintered matrices provided with a double porosity for use as storage cell electrode carriers. These carriers are made of spongy agglomerates comprising very small pores obtained by thermal decomposition of metal carbonyls which are sintered after having been divided into smaller agglomerates by mechanical treatment (e.g., sifting under pressure) to reduce the size of the pores between the agglomerates after sintering.

More recently, the French Pat. No. 1,427,244, filed Jan. 8, 1965 by Texas Instrument has described several processes for manufacturing electrodes with a double-pore distribution, more particularly for use in fuel cells. One of the disclosed processes consists in sintering very small microparticles to form a porous mass, which is ground into smaller agglomerates and again sintered to constitute an electrode. Another of the disclosed processes consists in electrodeposit of a spongy treeing structure which is divided into smaller agglomerates by grinding and then sintered to produce an electrode with a double porosity.

All prior art processes are systematically based on the formation of small agglomerates from large agglomerates by means of mechanical treatment. A drawback of such methods is that it requires modification in a more or less substantial manner according to the mechanical effect of division, of the initial primary structures which should be advantageously maintained or retained.

Objects and features of the present invention are to provide a novel, simple process for manufacturing electrodes having a double-pore distribution and without the above-mentioned drawback, so that electrodes so obtained are of improved structure and have high efficiency in operation.

Other objects and features of the invention are to provide a process giving:

very small primary particles with elongated crystallites;

conglomerates made of these very small primary particles, so that the powder formed by these conglomerate grains has a specific area larger than 2,000 cm$^2$ per gram, conglomerates having an average size comprised between 100 and 500 microns;

conglomerates consisting in practically concentric deposits of primary particles and nearly shaped as spheres or pseudospheres, and conglomerates slightly deformable by compression.

The novel process according to the invention comprises chemically reducing to the metallic state a solution of a salt of the metal intended to constitute the electrode, by the addition of an appropriate reducing agent, while the "solution-reducing agent" mixture is submitted to a perturbed whirling agitation so that the concentrations of salt and reducing agent are made uniform and so that a great number of metal "germs" are produced, the agitation being maintained in order to promote an agglomeration in successive concentric layers of particles until the desired size is obtained, then extracting the conglomerates from the mother-liquid when the predetermined size is reached and finally washing and drying the powder so prepared.

The perturbed whirling agitation can be obtained either by creating more than one vortex, or by perturbing one vortex by means of stationary obstacles.

According to another feature of the invention, the powders so prepared are agglomerated in the shape of electrodes by using any of the usual processes known in the metallurgy of powders.

The shaping of the electrodes can be carried out by compression, eventually followed by an appropriate moderate sintering, if required.

The invention is concerned particularly with silver powders obtained by the above-mentioned novel process.

This invention is also concerned with electrodes produced by the above-mentioned process, particularly silver electrodes which, due to the double-pore distribution, are electrochemically able to operate at high current densities without excessive polarization.

Other objects and features of the invention will become apparent from the following description together with the accompanying drawing, only given as a nonlimitative example, which will clearly show how the invention can be practiced, all particular features of the description as well as of the drawings, being naturally part of the invention.

In the drawings:

FIG. 1 is a diagram showing charge efficiency as ordinates as a function of the charging rate abscissae for a silver electrode prepared according to the invention comparatively to two conventional silver electrodes;

FIG. 2 is a diagram showing discharge curves at medium rate for a silver electrode according to the invention, comparatively to a conventional silver electrode, and FIG. 3 is a diagram similar to that of FIG. 2 with data taken at a higher discharge rate.

DETAILED DESCRIPTION

A method of practicing this invention in detail is as follows:

Example

Production of silver powder and of a silver electrode with double-pore distribution:

A solution of silver nitrate and a solution of sodium sulfite, in a determined ratio, are poured, while being stirred into a vessel fitted with an agitator comprising moving and stationary blades in order to create the necessary perturbed whirling. Preferably, similar molar concentrations, for example 1 M are used for both solutions. Sodium sulfite reduces silver nitrate into silver according to the reaction:

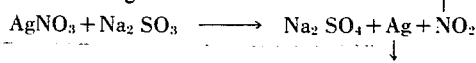

The pH of the mixture remains slightly acidic (about 6) if the constituents are added at the right ratio.

Agitation is maintained and contained until the conglomerates are formed to the desired size. At that moment, the conglomerates are separated from the mother-liquid, by straining, for example. The powder collected is then washed and dried. It then may be sifted for safety through an oscillating sieve so that the conglomerates are separated with no modification in their internal structure, conglomerates of undesired size thus being eliminated. Depending on stirring time, the sizes of the conglomerates are within the ranges of 100 and 500 microns approximately. The preferred sizes are in the range of from 150 to 200 microns. With this last value, apparent density of the powder is about 0.6. The specific surface area is comprised between 2,000 and 3,000 cm.$^2$ per gram.

Comparative X-ray studies of a silver powder obtained by practicing the invention from the above-mentioned reactive process, and a silver powder prepared by the same chemical process but with no perturbed whirling agitation show that the conglomerates of the powder prepared according to the process of the invention are formed with primary particles wherein crystallite sizes are modified more particularly in the direction perpendicular to (220) plan. The powder prepared according to the process of the invention is thus characterized by the deformation of the crystallites and this may explain their inherent ability to form conglomerates having the characteristics hereinabove described, since the comparative powder prepared without whirling agitation shows no deformation and does not exhibit this ability.

Electrodes are produced by compressing silver powder prepared by the process of this invention. These electrodes are used as positive electrodes of silver-zinc or silver-cadmium-type alkaline storage cells. The electrodes so prepared have shown an outstanding mechanical strength. But if electrode cohesion still requires reinforcement as by a sintering operation, care must be taken to avoid a too high sintering temperature which would modify the internal structure of the conglomerates. Very moderate sintering conditions, for example, for 1 minute at 725° C. are adequate for the electrode further described.

Preferably, the final porosity of the electrodes embodying powder prepared by practice of this invention, should be 50 or 60 percent which value is obtained by adjusting the quantity or powder according to the final specified thickness, by means of thrust-blocks, for example.

In the operating conditions prevailing in alkaline silver storage cells, the electrodes according to the invention permit much higher current densities than conventional electrodes, without prohibitive polarization. Thus, FIG. 1 shows charge efficiency (ordinates) as a function of the charging rate (abscissae) for electrodes prepared with three different silver powders: a common silver powder (curve A), a silver powder prepared by reduction of silver nitrate solution by sodium sulfite solution, without practice of perturbed whirling agitation according to the invention (curve B) and a silver powder with perturbed whirling agitation prepared according to the invention (curve C).

In deriving the data for these curves, electrode dimensions were 38.5×41,5×0.55 mm., porosity was 60 percent, capacity value was slightly under 2 ampere hours. The charging rates are plotted as fractions of the capacity, where C is the charge capacity of the electrode, for example, a rate of C/4, corresponds to a current density of 1,560 ma./dm.$^2$. The weight of the electrode was 3.7 g.

It is seen that with high charging rates, approximately up to C/3, charge efficiency of an electrode according to the invention (curve C) remained over 80 percent whereas charge efficiency of comparative electrodes (curves A and B) dropped sharply when charging rates exceeded C/16. This characteristic is very important because full charge of cells using electrodes of the invention can be completed in a substantially shorter time then that of common storage cells with electrodes not embodying the invention It must also be noted that, at least with low charging rates (about C/16 for example), the voltage plateau corresponding to silver oxidation into monovalent oxide is much longer for an electrode according to the invention than for a conventional electrode. In fact, the very large surface area of electrodes according to the invention added to the fast and regular distribution of electrolyte into the pores permits the conversion of a much larger quantity of silver into monovalent oxide than with conventional electrodes.

This result might be explained by the following consideration: during the charge of the electrodes, monovalent oxide is formed at first on the surface of the silver. As this oxide is highly resistive, the resistance of the layer increasing with the thickness will stop the electrochemical conversion of silver into monovalent silver oxide. The voltage of the electrode therefore passes to the value corresponding to the formation of the divalent silver oxide. For a given thickness of a monovalent oxide layer the quantity of oxide is the more important as the total area of the layer is larger, and thus the specific surface area of the silver is larger.

The discharge of electrodes according to the invention is characterized by a practically unique voltage plateau. This is very advantageous when overvoltages are not desired at the beginning of the discharge. FIGS. 2 and 3 illustrate discharge curves respectively at C/2 (medium rate) and 4C (high rate) of an electrode according to the invention (full line curve C', FIG. 2 and C'' FIG. 3) and of an electrode similar to that giving curve B in FIG. 1 (dotted line curve B' and B''). The respective electrode charges have been effected in 16 hours, at the rate of C/16. It can be seen that the electrode according to the invention was nearly fully charged, i.e. nearly all the silver has been oxidized, as shown by the relatively low initial voltage curve C'' at the high discharge rate (4C). This is due to the high resistivity of the charged electrode, which decreases as oxide is converted into silver. On the other hand, it is seen that discharge efficiency is 95 percent at C/2 rate (curve C', FIG. 2) for the electrode according to the invention compared to 87 percent for the comparative electrode (curve B', FIG. 3). These efficiency values correspond to power values of 2.9 Wh for an electrode according to the invention, i.e. 725 Wh./kg., and 2.75 Wh. for the comparative different electrode i.e. 688 Wh./kg. At the high rate (4C), efficiencies are 89 percent and 80 percent respectively (curves C'' and B'') corresponding to powers of 2.5 Wh. (i.e. 625 Wh./kg.) and 2.3 Wh. (i.e. 575 Wh./kg.) respectively. The shift increases with the charging rate.

The process according to the invention, therefore, permits the production of electrodes for alkaline storage cells and/or fuel cells with improved performance.

While specific embodiments of the invention have been described, variations within the scope of the appended claims are possible and are contemplated without departing from the scope of the invention. There is no intention, therefore, of limitation to the exact abstract or disclosure herein presented.

What is claimed is:

1. A process for manufacturing a metal powder having a predetermined structure, comprising the steps of chemically reducing to the metallic state a salt solution of the metal intended to constitute the electrode by the addition thereto of a reducing agent while the "solution-reducing agent" mixture is submitted to a perturbed whirling agitation so that the concentrations of salt and reducing agent are made uniform and that a great number of metal germs are produced, the said agitation being maintained in order to promote an agglomeration in successive concentric layers of metal particles until a predetermined particle size is obtained in the conglomerate, then separating the conglomerate from the mother-liquid when said required size is reached and finally washing and drying the resulting powder.

2. A process according to claim 1, wherein said perturbed whirling agitation is effected by creating a plurality of vortices in the "solution-reducing agent" mixture.

3. A process according to claim 1, wherein said perturbed whirling agitation is effected by producing a single vortex in the "solution-reducing agent" mixture and perturbing said vortex.

4. A process according to claim 1, wherein the metal salt solution is silver nitrate and the reducing agent is sodium sulfite solution whose molar concentrations are alike and the conglomerate is silver.

5. A process according to claim 4, wherein the molar concentrations of both solutions are 1M.

6. A process according to claim 1, wherein said perturbed whirling operation is maintained until the particle size of the conglomerate in the resulting powder have dimensions comprised between 100 and 500 microns.

7. A process according to claim 6, wherein said dimensions are between 150 and 300 microns, the apparent density of the powder is approximately 0.6 and the specific surface area is approximately from 2,000–3,000 cm²/g.

8. A process according to claim 1, wherein the resulting dried powder is compressed into the form of an electrode of desired dimensions.

9. A process according to claim 8, wherein subsequent to compression of the powder sintering is effected at moderate temperature for a limited time.

10. A process according to claim 9, wherein the temperature is approximately 725° C. and the time is approximately 1 minute.

* * * * *